Figure 1:
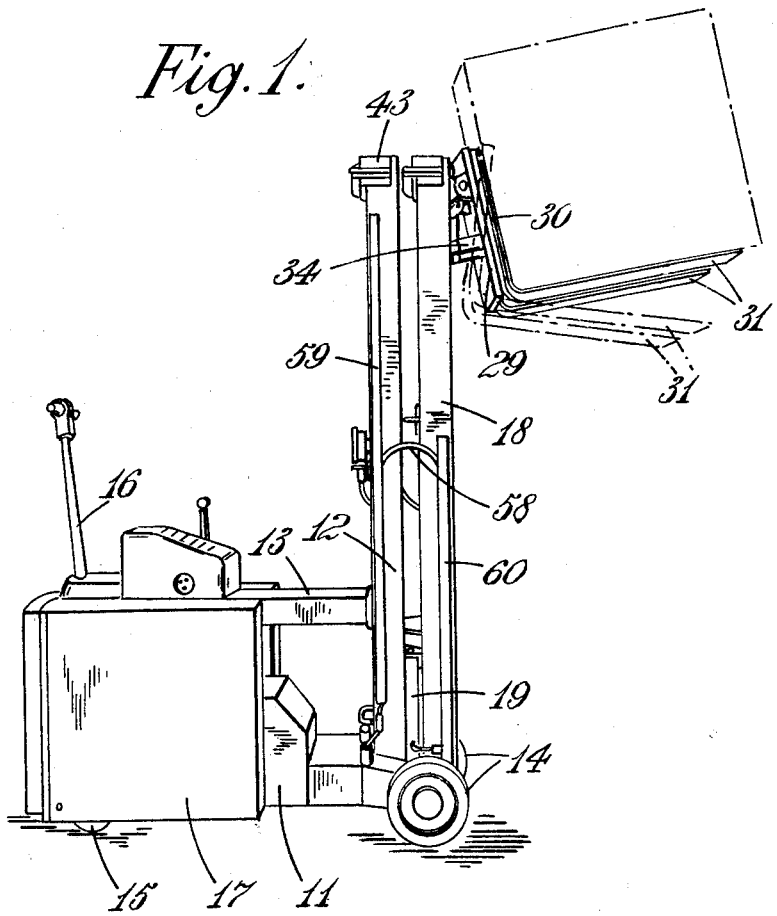

March 13, 1956     A. E. R. ARNOT     2,738,087
FORK LIFT TRUCK

Filed May 12, 1953     5 Sheets-Sheet 1

INVENTOR
ALFRED ERWIN REGINALD ARNOT
BY
    Rowland V. Patrick
        ATTORNEY

March 13, 1956 A. E. R. ARNOT 2,738,087
FORK LIFT TRUCK

Filed May 12, 1953 5 Sheets-Sheet 2

INVENTOR
ALFRED ERWIN REGINALD ARNOT
BY
Rowland V. Patuck
ATTORNEY

INVENTOR
ALFRED ERWIN REGINALD ARNOT
BY Rowland V. Patrick
ATTORNEY

March 13, 1956  A. E. R. ARNOT  2,738,087
FORK LIFT TRUCK
Filed May 12, 1953  5 Sheets-Sheet 5
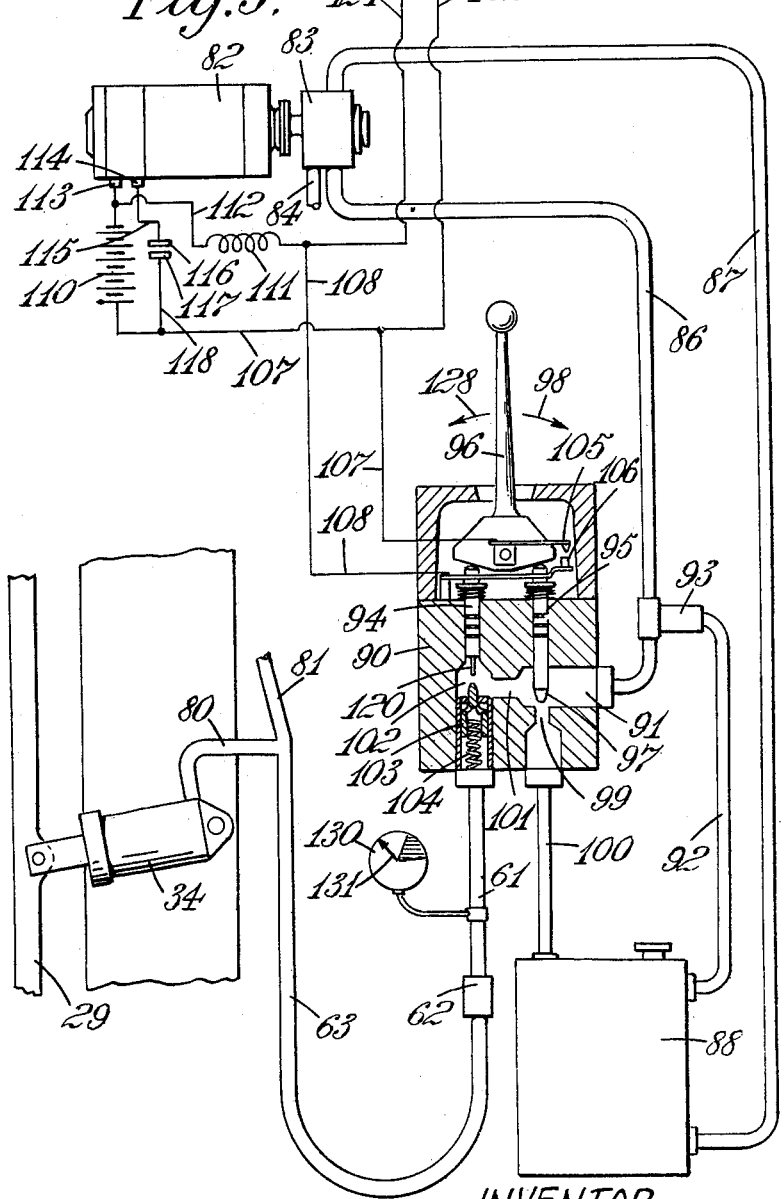
INVENTOR
ALFRED ERWIN REGINALD ARNOT
BY
Rowland V. Patuck
ATTORNEY

United States Patent Office 2,738,087
Patented Mar. 13, 1956

2,738,087

FORK LIFT TRUCK

Alfred Erwin Reginald Arnot, Basingstoke, England, assignor to John Reginald Sharp and Emmanuel Kaye, both of Basingstoke, England Application May 12, 1953, Serial No. 354,619

Claims priority, application Great Britain May 15, 1952

8 Claims. (Cl. 214—701)

This invention comprises improvements in or relating to fork and like trucks.

Goods-handling trucks are well-known which comprise a forwardly projecting bracket consisting of a pair of fork arms which are mounted on a cradle running in guides, so that the bracket can be raised or lowered to any desired height within the capacity of the truck for the purpose of stacking goods one upon another and of lifting them from the ground. It is frequently desirable to be able to tilt the fork arms or other bracket up or down, for example to enable the fork arms to rest at their front end upon the floor notwithstanding the fact that the truck may be on a part of the floor such as a ramp which is at an angle to the part where the fork arms rest, or to pick up or disengage a load which is placed on a sloping platform, or again to tip the fork arms up in order to balance the goods carried more securely.

Normally the tilting up or down of the bracket is effected by making the guides in which the cradle rests so that they are pivoted to the chassis of the truck at their lower end and are connected to a tilting cylinder at some point in their length.

Tilting the guides has, however, the disadvantage that when they are tilted backwards to raise the fork arms they encroach on the space available on the truck for the operator or the steering gear and the like. It will be appreciated that it is important in trucks of this kind to keep the length of the truck to the minimum possible in order to improve manoeuvrability. As the guides are long, when they are tilted back they encroach on the space very considerably and make it necessary to design the truck to have a greater length than is desirable, or would be necessary if there were no tilting. Also when tilted forward the load is carried out further from the front axle of the truck and the tipping moment is increased, so that the counter-balance weight must be increased to ensure safe working.

It has been suggested to tilt the forks relatively to the guide, but the constructions of this kind suggested heretofore have had various disadvantages. It is an object of the present invention to provide an improved construction in which the mechanical arrangement of the parts is as compact as possible and in which the centre of gravity of the load is not materially altered when the forks are tilted. By compactness of the mechanism the centre of gravity of the load is kept as close as possible to the wheels and by ensuring that it is not altered when the forks are tilted the load is prevented from assuming a position due to tilting which might increase the tipping moment of the load relatively to the truck. The counter-balance weight can therefore be kept at a minimum and the overall weight of the truck is reduced.

The present invention includes in a fork truck having a lifting fork the provision of a fork mounting comprising a back rigid with the forks, a hinge for the back at a level approximately the same as the centre of gravity of a normal load, a hydraulic adjusting jack or jacks engaging the back below the hinge and a sensitive control valve to control the jack or jacks to adjust the angle of the forks up and down.

According to a further feature of the invention a fork truck is provided in which the mast is constructed of a pair of parallel channel members with the channels directed towards one another, a cradle which can be moved up or down the mast and which runs in the space between the channel members, forks pivoted to the cradle so as to be tiltable relatively thereto, and jack members for operating the forks which are located in the space between the channel members.

Preferably, the construction is such that the jack cylinders do not project rearwardly of the mast. This permits the use of a second mast behind the first, but very close thereto without being interfered with by the tilting mechanism on the forward mast.

Figure 2:
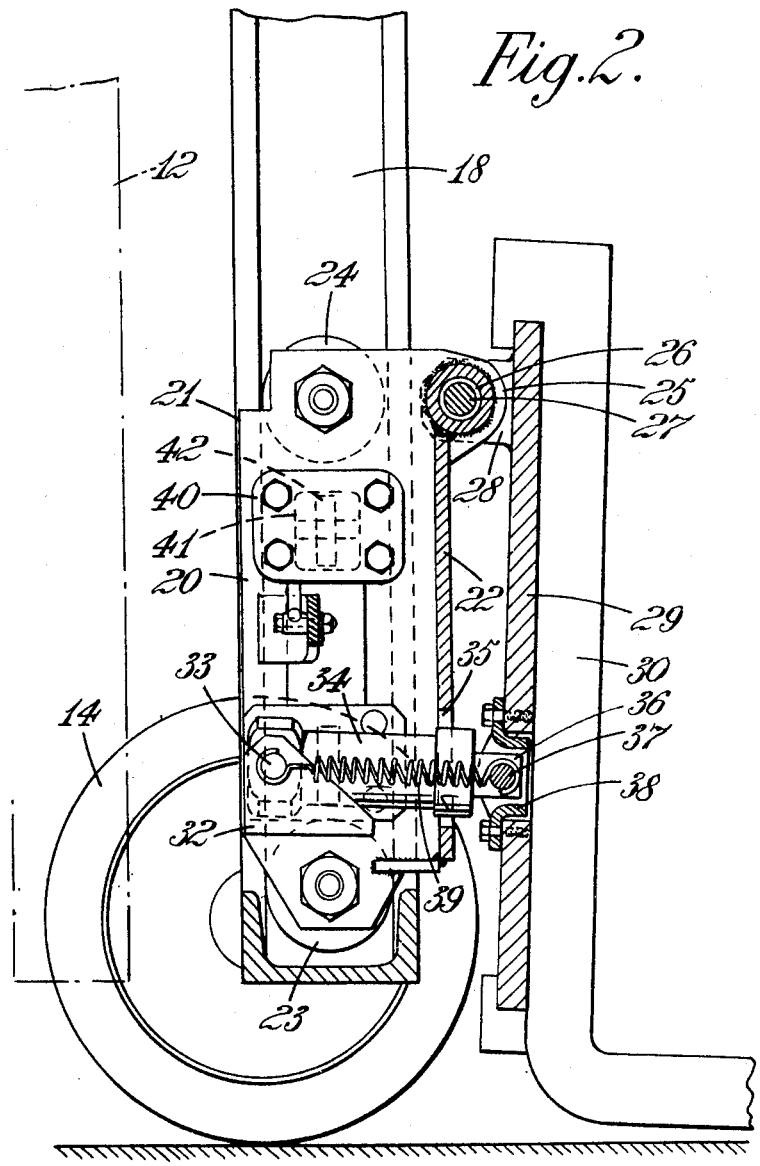
Figure 3:
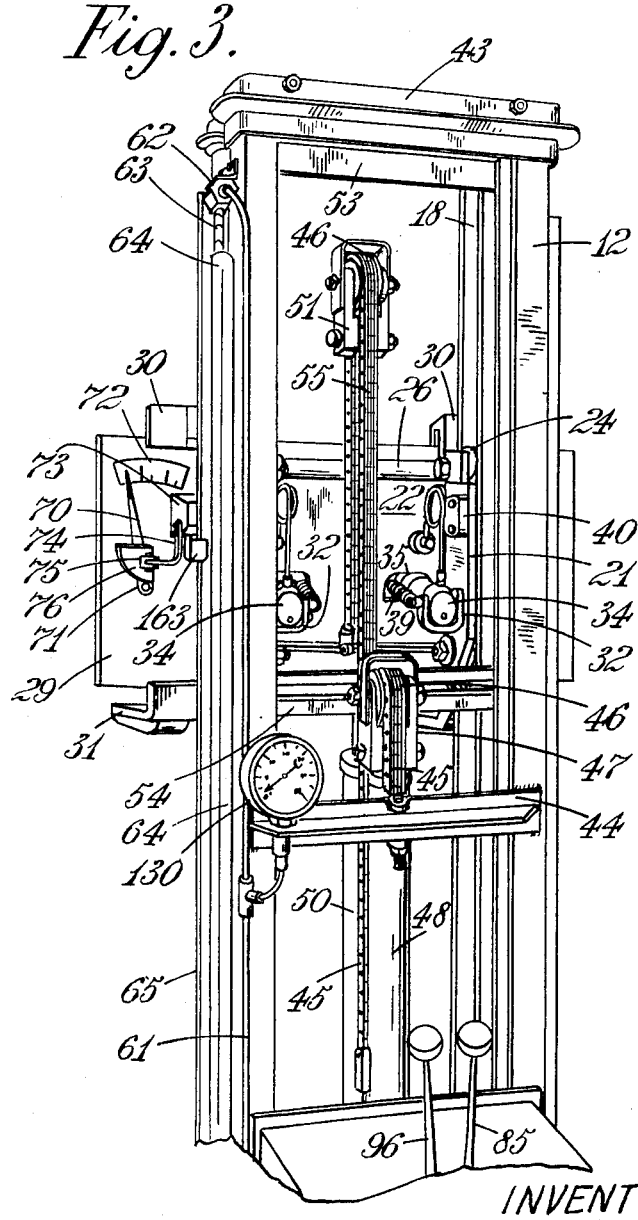
Figure 4:
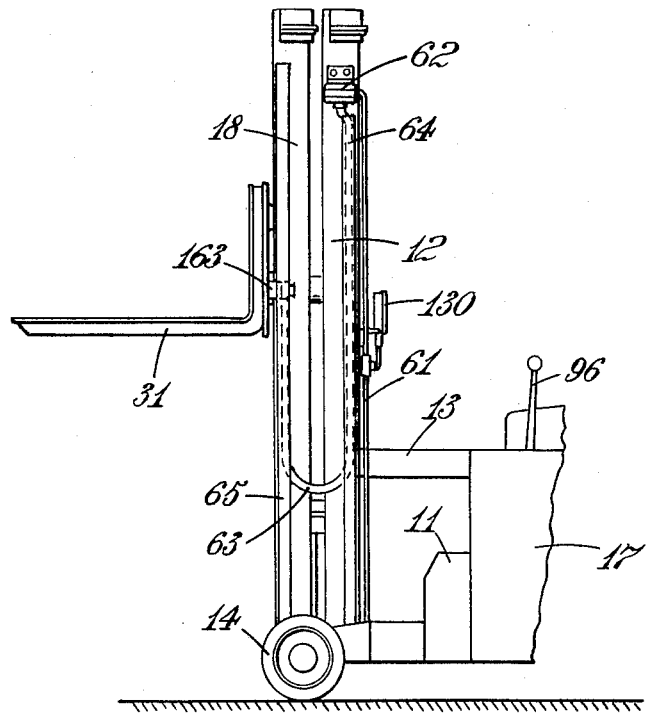

The following is a description by way of example of one construction in accordance with the invention, reference being made to the accompanying drawings, in which:

Figure 1 is a general perspective view of a truck in accordance with the invention, Figure 2 is a detail of the mast and fork-carrying cradle of the truck shown in Figure 1, some of the parts being shown in vertical section, Figure 3 is a perspective view of the mast construction and cradle as viewed from the rear, Figure 4 is a side elevation of the mast portion of the truck viewed from the opposite side to that shown in Figure 1, and Figure 5 is a diagram of hydraulic connections.

Referring to Figure 1, the truck consists of a chassis 11 to which is rigidly fixed a mast 12 consisting of upright channel members arranged with their flanges pointing towards one another. The mast is held rigidly upright by a strut 13 and the chassis at the front end carries two ground wheels 14 and at the back there is a driving wheel 15 which is mounted on the underside of a turntable controlled by a tiller 16. The driving wheel 15 is driven by a suitable reduction gear from a motor contained within the casing 17. In front of the fixed mast 12 there is a rising mast 18 which is carried on a cradle 19 provided with rollers which run between the flanges of the side members of the mast 12. By raising the cradle 19 the mast 18 can be lifted so as to form a vertical upwardly extending addendum to the mast 12. The mast 18 likewise consists of two channel members having flanges which face towards one another and between these channels members there runs a cradle 20 which is best seen in the detail view, Figure 2.

Referring to Figures 2 and 3, the cradle 20 comprises two side plates 31 which are united together by a front plate 22 which is nearly vertical and extends between them. Each of the side plates carries a pair of rollers 23, 24 which run in the channels of the mast 18 and serve to guide the cradle up and down. At the upper end of each of the side plates 21 there is a forwardly projecting lug 25, and the lugs 25 are united by a cross-tube 26 welded between them and extending above the upper edge of the plate 22. Through the tube 26 and the lugs 25 there extends a pivot spindle 27 which projects beyond the lugs at each side and enters lugs 28 which projects from the back of a large back plate 29 on which are secured back members 30 of fork arms 31.

Secured to the lower part of each of the side plates 21 of the cradle is a bracket 32, and the brackets 32 carry pivots 33 for the rear ends of short jack cylinders 34. It will be noted that the pivots 33 of the jack cylinders are located close to the rear flange of the mast 18, and the jack cylinders extend forwardly from their pivots but are short enough not to project much in front of the mast. The front ends of the jack cylinders 34 pass freely through apertures 35 in the plate 22, and the cylinders contain hydraulic rams 36 which are pivoted by pins 37 in fittings 38 bolted to the back plate 29 which carries the fork arms. If, therefore, the jack cylinders are extended the fork arms will be tilted upwardly, while if they are retracted they will be tilted downwardly. They are shown tilted upwardly in Figure 1, and the chain lines in this figure show them tilted downwardly. The jack cylinders 34 are single-acting and retraction is assisted by springs 39, the ends of which embrace the pivot pins 33, 37, and also by the weight of the forks and load.

The side plates 21 of the cradle 20 also carry roller brackets 40 which are bolted inside the side plates and extend through apertures 41 shown in dotted lines in Figure 2 of the drawing. These roller carriers carry rollers 42 which can be adjusted by shims to bear on the webs of the channels 18 and serve to centre the cradle laterally.

Referring to Figure 3 of the drawing more particularly the mast 12 is shown in this figure nearer to the beholder, and it will be seen that the two side channels of this mast are united at the top by a cross member 43, and lower down by a lower cross member 44. To the latter there is anchored a chain or cable 45 which passes over a pulley 46 mounted on a head 47 which is carried on the ram of a lifting cylinder 48. The other end of the chain 45 passes downwardly into engagement with the cradle 19 (not visible in Figure 3, but seen in Figure 1) which carries the mast 18. The elevation of the mast 18 is therefore accomplished by the cylinder 48 when extended. Secured on the cradle 19 is a second cylinder 50 similar to the cylinder 48 and provided with a ram having a head 51. The sides of the mast 18 are united together at the top by a cross member 53 and at a lower level by a cross member 54, these two members being similar to the members 43 and 44 of the mast 12. A chain 55 extends upwardly from the cross member 54, over a pulley 46 on the head 51 of the ram of the cylinder 50 and thence downwardly to an anchoring point on the plate 22 of the cradle 20. Therefore the cylinder 50 can raise and lower the cradle 20, and with it the forks 31, up and down the mast 18.

There is a high pressure hydraulic supply to the cylinder 50 and to the jack cylinders 34 through a special form of flexible connection, part of which can be seen in Figure 1 of the drawing where a flexible pipe 58 extends up through a guard 59 secured to the mast 12 and bends over into a guard 60 secured to the mast 18. As the mast 18 moves upwardly, the flexible pipe 58 unrolls from the guard 60 and rolls into the guard 59.

Another pipe 61 on the other side of the mast 12 extends upwardly to a flow-control valve 62 at the top of this mast, whence a flexible pipe 63 (see Figure 4) extends downwardly into a guard 64. The pipe 63 bends out of the guard 64 and across, as shown in Figure 4, into a guard 65 mounted on the mast 18. The pipe 63 passes upwardly through the guard 65 to a fitting 163 carried on the cradle 21 and from the fitting 163 pipes extend to the jacks 34. The effect of this arrangement is that if the mast 18 is elevated the pipe 63 will unroll from guard 64 into guard 65 (just like the pipe 58 will do as shown in Figure 1). When the cradle 21 is lifted relatively to the mast 18 a further unrolling from guard 64 takes place, the pipe 63 in this case sliding in the guard 65. By making the pipe 63 long enough, therefore, the extension of the mast 18 and of cradle 21 are both allowed for with a single pipe having in it only a single bend.

It is important for the operator to be aware of the degree of tilt which he has imparted to the forks 31 by operating the jacks 34. To this end a tilt indicator is provided on the back of the plate 29. This consists of a pointer 70 pivoted at 71 on the back of the plate and movable over a scale 72 which shows the degree of tilt. A bracket 73 projects laterally from the plate 22 of the cradle 20, and to this is secured rigidly a roller-carrying arm 74 supporting a roller 75. The pointer 70 has rigidly secured to it an inclined cam plate 76 which engages the roller 75. When the plate 29 is tilted by the jacks 34 relatively to the plate 22 the cam 76 moves towards or from the back of the truck, that is towards or from the operator who is standing by the tiller 16. This movement cannot readily be gauged by the operator unaided, but as the cam 76 moves towards or from him its inclined surface rides on the roller 75 and this causes the pointer 70 to move to the left or right over the scale 72, which can easily be read by the operator. A spring, not visible in the drawing, around the pivot 71 serves to urge the pointer 70 to the right as viewed in the drawing and the cam pushes it against the spring towards the left.

This construction enables the fork arms 31 to be tilted up or down relatively to the cradle and the usual range of 10° backward tilt and 2° forward tilt can be secured easily without the top back edge of a normal load height fouling the mast 18 which carries the cradle 20. These movements are sufficient for normal requirements and as the guide is rigid relatively to the chassis no encroachment on the space available for the operator and control occurs; the load centre does not move forward when tilting forwards; the mast structure is rigid and resists flexing, which is common in fork trucks when the load is lifted to a considerable height, and safety is increased as the tilt jacks 34 do not cause the complete mast and load to fall forwards in the event of failure of the jack or of its attachment to the parts, as is the case when the mast itself is tilted.

Referring now to Figure 5, which shows hydraulic connections, this shows the jack 34 operating on the back plate 29 which carries the fork arms. The pipe 63 which has been already referred to is indicated in the diagram having branches 80, 81 to the two jacks 34, of which only one is shown in the drawing. An electric motor 82 drives a pump 83, these parts being located in the casing 17 of the truck. The pump 83 has two separate deliveries. One is by a pipe 84 which leads to the jacks 48, 50 used for elevating the mast 18 and cradle 21. These are controlled by the lever 85 shown in Figure 3 of the drawing and are not further described herein as they are common practice.

The other delivery of the pump 83 is by way of pipe 86 and used for controlling the jacks 34. The pump 83 draws hydraulic fluid by way of suction pipe 87 from a reservoir 88 located in the casing 17. The jacks 34 are controlled by a sensitive control valve 90 having an inlet 91 to which the pipe 86 delivers. The usual by-pass 92 and relief valve 93 for opening the by-pass to the reservoir 88 is provided.

The control valve 90 contains two valve operating plungers 94, 95 which are guided by a lever 96 seen in Figure 3 for the purpose of controlling the tilt of the forks. The plunger 95 has a tapered lower end 97, and if the lever 96 is moved to the right as shown in the diagram and indicated by the arrow 98 the plunger 95 is depressed so as to obturate more or less a port 99 leading to a drain pipe 100 and the reservoir 88. As the port 99 is closed, so the pressure rises in the inlet 91 which is connected by an internal passage 101 in the valve body 90 to a delivery valve chamber 102. In the delivery valve chamber 102 is a lift valve 103 capable of being closed by a spring 104 but arranged so that it will be open when the pressure rises to a point sufficient to overcome the spring 104 and permit the hydraulic fluid to pass to the pipe 63 and jacks 34 so as to lift the forks.

The lever 96 is capable when moved in the direction of the arrow 98 of bearing on a spring contact member 105 so as to bring it into contact with a second contact member 106 and close an electric circuit from line 107 to line 108. The line 107 leads from one terminal of an electric battery 110, and the line 108 leads to a solenoid coil 111 and thence by line 112 to the other terminal of the battery 110. The motor 82 has a terminal 113 connected to the battery 110 and a terminal 114 connected by line 115 to one of a pair of contacts 116, 117 which are closed by energisation of the solenoid 111. From the contact 117 extends line 118 to the other terminal of the battery. The effect is that as soon as the lever 96 is moved in the direction of the arrow 98 it closes the contacts 105, 106, energises the solenoid 111, and this, by closing the contacts 116, 117 starts the motor 82 and commences delivery of pressure fluid to the valve 90. Further movement of the lever 96 keeps contacts 105, 106, closed while the valve 97 is closing the port 99. The extent of the movement of the lever 96 determines the amount of the rise in pressure in the valve chamber 102 and the operator can readily gauge its movement so that it is just sufficient to lift the forks 31 of the truck as slowly or as fast as he pleases within the capacity of the pump.

As soon as the operator lets go the lever 96 the plunger 95 rises again, the lever 96 is centralised and the motor 82 is stopped. The valve 103 is then returned by the spring 104 to the closed position and the jacks 34 are held in the position of adjustment to which they have attained. Any degree of tilt required can therefore be achieved and will be demonstrated to the operator by the pointer 70.

When it is desired to lower the forks again, the operator moves lever 96 in the opposite direction, that is to say, in the direction of the arrow 128. This depresses the plunger 94, the lower end of which carries an abutment 120 to bear on the upper end of the valve 103 and open it. The upper end of the valve 103 is tapered, and the further the operator pushes over the lever 96 the wider will the opening be. The springs 39, aided by the weight of the forks and cradle and any weight which may be rested thereon will lower the forks and the rate of lowering is determined by the extent of movement of the lever 96 in the direction of the arrow 128, so that it is perfectly under control of the operator and can be stopped at any point he wishes by releasing the lever, so that it is centralised again. The flow-control valve 62 ensures that it is impossible to lower the forks too rapidly even if the valve 103 is fully opened by the operator.

It will be noted that the relief valve 93 does not come into operation unless the operator holds the lever 96 in the direction of the arrow 98 until after the jack 34 has raised the forks to the maximum extent. There is therefore no constant waste of power at this relief valve.

A pressure-gauge 130 is provided on pipe 61 and as the moment of the load on the forks has to be balanced by the moment of the jacks which tilt them, the pressure gauge will shown this moment by its pointer 131. When the moment is so great that it might overturn the truck, the operator will see the fact from the gauge and can desist from attempting to lift it. To help him, the part of the scale above the danger line can be coloured red, as indicated by shading 132 (Figure 5).

As the motor 82 is also used for supplying the pipe 84 which leads to the jacks 48, 50, control lines 121, 122 are provided as branches from the lines 107, 108 for operation by the lever 85, but as the operation of the masts and lifting of the cradle is well-known the details are not shown herein.

I claim:

1. A fork truck comprising a chassis, a fixed mast rigidly secured to the front of said chassis, said mast including two upright channel members having their flanges facing one another, a sliding mast positioned in front of said fixed mast, said sliding mast including two upright channel members with their flanges facing one another, said sliding mast being slidably connected to said fixed mast by brackets extending rearwardly from its lower end between the flanges of the fixed mast, a cradle movable up and down on the sliding mast, said cradle including a plate mounted in front of the sliding mast, brackets extending rearwardly therefrom between the flanges of said sliding mast, a fork-assembly pivoted on a horizontal axis to the upper edge of the cradle and depending therefrom, forks projecting forwardly from the lower portion of the fork-assembly, and tilting-jacks on the cradle between the sides of the sliding mast behind the lower portion of the fork-assembly and extending between the same and a point on the cradle not substantially behind the back of the sliding mast.

2. A fork truck as claimed in claim 1 wherein the jacks are mounted in brackets secured to the inner sides of the side plates.

3. A fork truck as claimed in claim 1 wherein the cradle which carries the fork assembly carries also a tilt-indicating pointer and means for operating it by relative movement between the cradle and the fork assembly.

4. A fork truck as claimed in claim 1 wherein the conduit which carries the hydraulic fluid to the hydraulic jacks for tilting the forks is provided with a pressure gauge marked to indicate the safe limit of the moment of the load in the forks.

5. A fork truck as claimed in claim 1 wherein the said means for tilting the fork assembly is connected to a control valve mounted upon the chassis by means of a flexible pipe which passes downwardly from the cradle within a guard movable with the mast which carries the cradle and then upwardly within a second guard to a point of supply (carried for example at the top of a second mast) which is sufficiently high to accommodate all the cradle movements by unrolling of the flexible pipe from one guard to the other and sliding of the pipe relatively to the first said guard.

6. A fork truck comprising a chassis, a fixed mast comprising upright side members rigidly secured to the front of said chassis, a sliding mast slidably connected to said fixed mast, said sliding mast comprising upright side members and a bracket slidably connected to run on the side members of the fixed mast, hydraulic cylinder means for raising said sliding mast, a cradle slidably mounted to run on the side members of the sliding mast, hydraulic means for lifting the cradle relatively to the sliding mast, a fork-assembly pivoted to the upper edge of the cradle about a substantially horizontal axis, tilting jacks on the cradle between the side of the sliding mast behind the lower portion of the fork assembly and extending between the same and a point on the cradle not substantially behind the back of the sliding mast.

7. A fork truck as claimed in claim 6 having a flexible pipe connection between the cradle and a point on the fixed mast, and means to supply hydraulic pressure to the hydraulic cylinder means on the cradle to tilt the fork, said means comprising a non-return valve and means for opening the non-return valve to permit regulated escape of hydraulic fluid from the hydraulic cylinder means on the cradle.

8. A fork truck as claimed in claim 7, wherein the non-return valve is located in a valve control box, and the valve control box includes a tapered plug member to regulate outflow of fluid under pressure supplied to the valve box whereby upon closing the outflow by means of the tapered member, the pressure can be regulated to a point at which the jack member on the cradle operates.

References Cited in the file of this patent

UNITED STATES PATENTS

| | | |
|---|---|---|
| 2,427,301 | Puim | Sept. 9, 1947 |
| 2,528,401 | Ulinski | Oct. 31, 1950 |
| 2,548,084 | Wagner | Apr. 10, 1951 |
| 2,575,552 | Glenn, Jr. | Nov. 20, 1951 |
| 2,598,865 | Turner | June 3, 1952 |
| 2,608,315 | Turner | Aug. 26, 1952 |
| 2,622,751 | Shaffer | Dec. 23, 1952 |
| 2,665,022 | Dunham | Jan. 5, 1954 |
| 2,677,475 | Davies et al. | May 4, 1954 |